United States Patent [19]

Hessels

[11] 4,210,190

[45] Jul. 1, 1980

[54] DEVICES FOR FITTING AND REMOVING TIRES

[75] Inventor: Eleutheer A. Hessels, Sint Niklaas, Belgium

[73] Assignee: Manta, Naamloze Venncotschap, Waasmunster, Belgium

[21] Appl. No.: 784,434

[22] Filed: Apr. 4, 1977

[30] Foreign Application Priority Data

Apr. 7, 1976 [BE] Belgium .................................. 840441
Mar. 21, 1977 [BE] Belgium .................................. 255756

[51] Int. Cl.² ............................................. B60C 25/06
[52] U.S. Cl. ................................................. 157/1.24
[58] Field of Search ...................... 157/1.22, 1.24, 1.17

[56] References Cited

U.S. PATENT DOCUMENTS

| | | | |
|---|---|---|---|
| 3,528,475 | 9/1970 | Duquesne | 157/1.24 |
| 3,791,434 | 2/1974 | Duquesne | 157/1.24 |
| 3,815,653 | 6/1974 | Scott et al. | 157/1.24 |

*Primary Examiner*—James G. Smith
*Attorney, Agent, or Firm*—Bacon & Thomas

[57] ABSTRACT

The invention pertains to improvements to devices for fitting and removing tires, whereby the fitting and removing tool can be moved both horizontally and vertically and is adjustable relative to the dimensions of the wheel rim, characterized by the fact that means are provided which permit aforesaid tool to be clamped in any possible horizontal position; means which permit aforesaid tool to be clamped in any vertical position whatever and means which permit aforesaid tool to be moved over a short distance during the clamping operation, in order to assure that it will clear the rim, whereby aforesaid means are controlled by means of one single handle.

9 Claims, 13 Drawing Figures

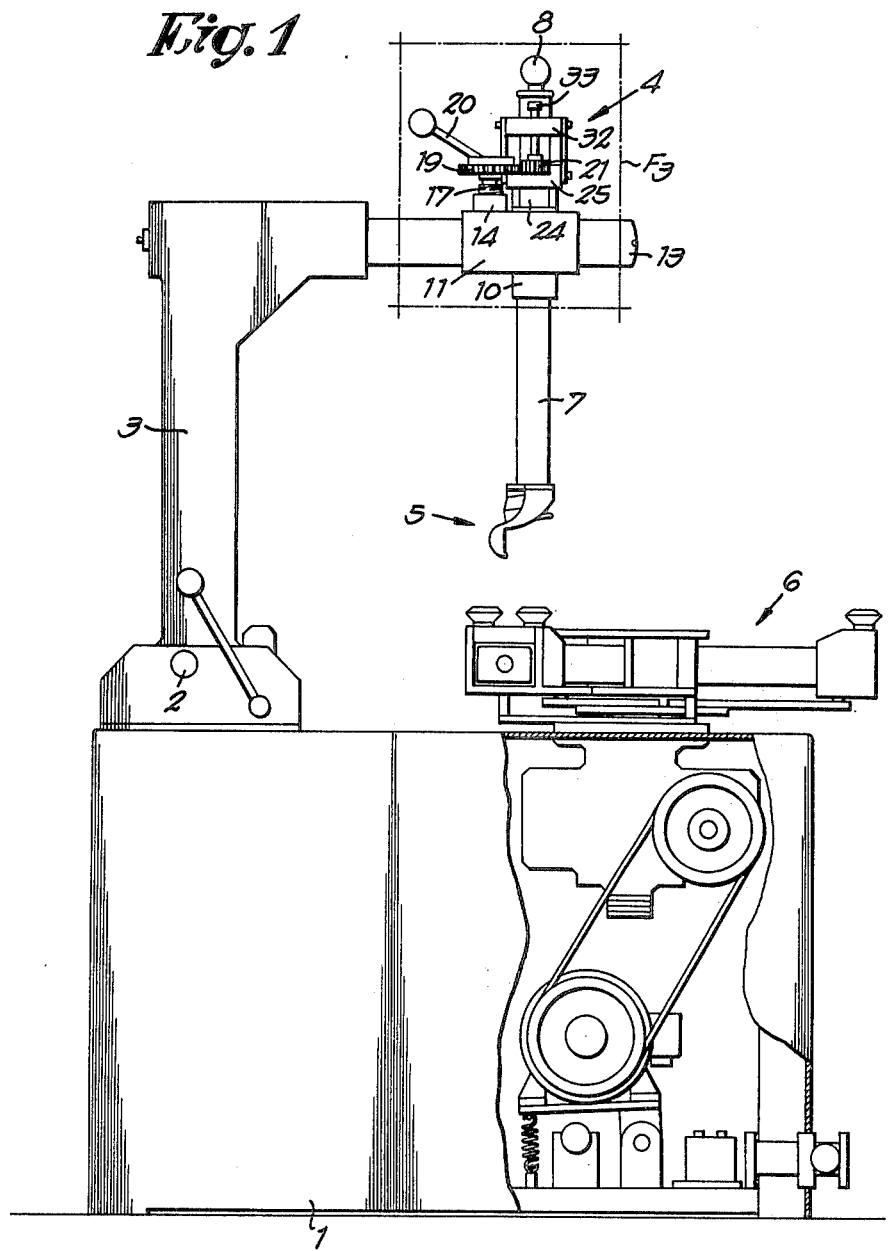

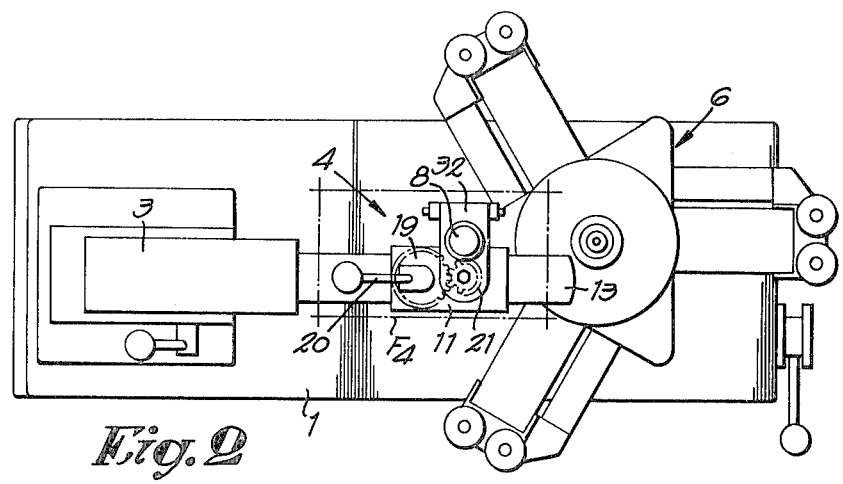
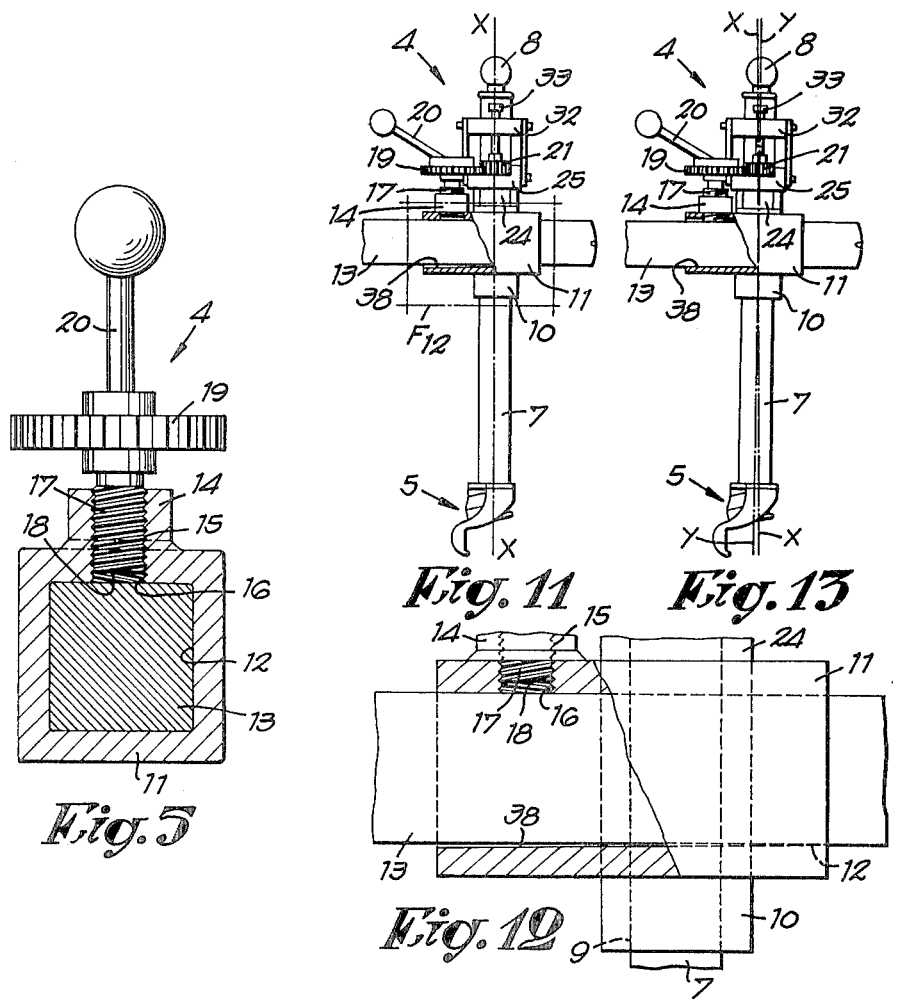

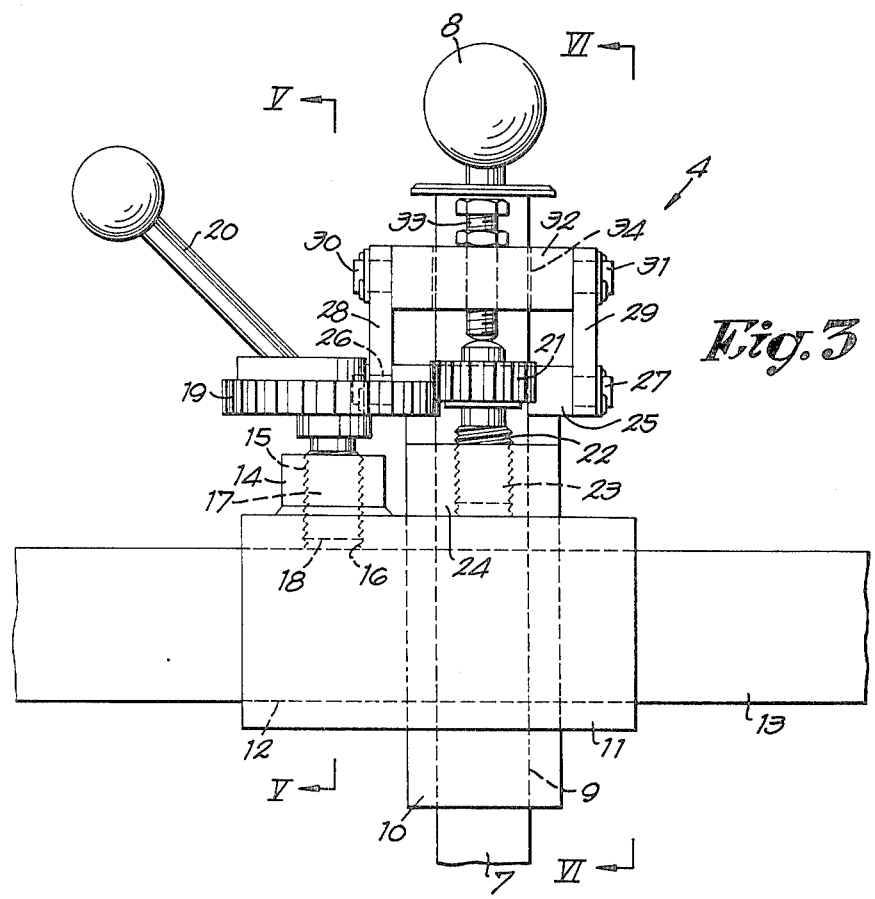
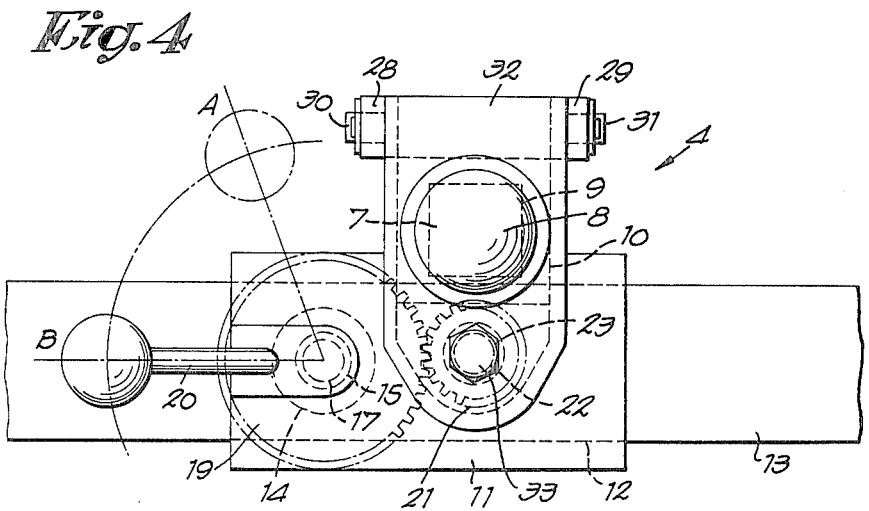

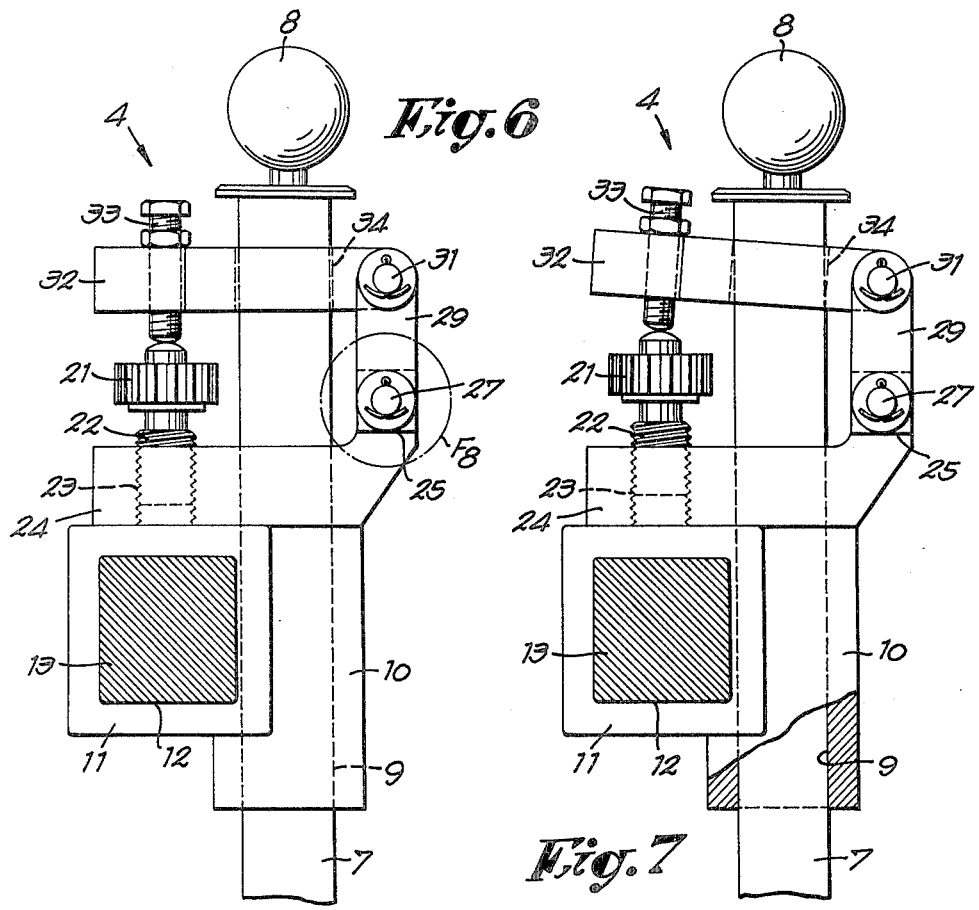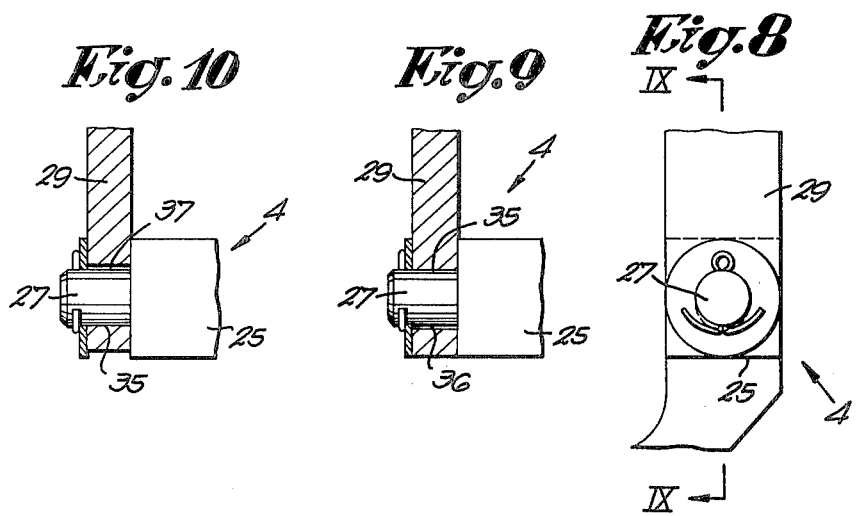

DEVICES FOR FITTING AND REMOVING TIRES

The present invention pertains to improvements to devices for the fitting and the removing of tires, by means of which a very wide range of different thicknesses and widths of tires and rims can be handled, and whereby this device which operates in a most simple, efficient and trustworthy manner, offers maximum safety for the tires as well as the rims, which is of capital importance in the case of light metal rims, which are most easily damaged.

The improvements which constitute the subject of the present application consist mainly in providing, in such devices for the fitting and the removing of tires, a clamping device, more particularly a device which permits in a most simple manner to adjust the fitting, or respectively removing tool, relative to the height or thickness of the rim, and possibly at the same time with respect to the diameter of the rim, whereby the clamping device according to the invention permits the horizontal and vertical locking of the fitting, or respectively removing tool, by means of a single handle and by means of a single movement of this handle, with respect to the machine frame, whereby it simultaneously moves the tool upward over a short distance and possibly also sideways so as to avoid any interference of this tool with the rim.

The clamping device according to the invention, which boasts the above-mentioned advantages and others as well, mainly consists for this purpose in the provision of means which permit the firm clamping of aforesaid tool in any horizontal position whatever; means which permit aforesaid tool to be firmly clamped in any vertical position whatever and means which permit moving aforesaid tool over a small distance during the clamping operation, so as to make it clear the wheel rim, whereby the three afore-mentioned means are controlled by one single handle and by one single movement of the latter.

In view of clarifying the characteristics of the invention, a preferred form of embodiment will be described hereinafter, as example and without the slightest intent of limitation, with reference to the appended drawings in which:

FIG. 1 shows a schematic side view of a device for the fitting, or respectively for the removal of tires, upon which the clamping device according to the invention has been fitted;

FIG. 2 shows a schematic top view of FIG. 1;

FIG. 3 shows, to a larger scale, that part of FIG. 1 which is indicated by F3;

FIG. 4 shows a top view of FIG. 3, and more particularly, to a larger scale, shows that part of FIG. 2 which is indicated by F4;

FIGS. 5 and 6 are respective cross-sections according to lines V—V and VI—VI in FIG. 3;

FIG. 7 is a similar cross-section to that of FIG. 6, but for a second characteristic position;

FIG. 8 shows, to a larger scale, that part in FIG. 6 which is indicated by F8;

FIG. 9 shows a cross-section according to line IX—IX in FIG. 8;

FIG. 10 is a similar cross-section to that of FIG. 9, but for the position of the device as illustrated in FIG. 7;

FIG. 11 shows, to a smaller scale, a view which is similar to that of FIG. 3, but for an alternative form of embodiment;

FIG. 12 shows to a larger scale, that part in FIG. 11 which is indicated by F12, and FIG. 13 is a view which is similar to that of FIG. 11, but for a second position.

As illustrated in FIGS. 1 and 2, a machine merely shown as limiting example and upon which the clamping device according to the invention has been fitted, mainly consists of a lower part or frame 1, upon which a column 3, which can be tilted rearward around shaft 2, is provided, whereby said column bears a clamping device 4 according to the invention. By means of this clamping device 4, the fitting or removing tool 5 is attached, whereas aforesaid frame 1 comprises a clamping device 6 for the rim.

Tool 5 as well as clamping device 6 being the subject of other patent applications by the applicant, they will not be further described in the present application.

According to the invention, the fitting, or respectively removing tool 5, is attached to the lower end of a rod or bar 7 which in the present case boasts a square cross-section, and the top end of which is provided with a knob, handle or suchlike 8. Bar 7 freely passes through a vertical guide 9 of a body 10, whereby the latter is solidly attached to a horizontal body 11 which is provided with a passage 12 by means of which bodies 10 and 11 can be moved horizontally along a beam 13 which is solidly fixed to aforesaid column 3.

On body 11 there is provided a boss 14 which boasts a central threaded bore 15, the latter being extended by a part 16 which opens up in passage 12 of body 11. A threaded rod 17 cooperates with these threads 15-16 and is provided at its bottom end with a pressure stud 18, whereby this threaded rod 17 is provided, above aforesaid boss 14, with a gear 19, to which finally a handle 20 is attached.

Afore-mentioned gear 19 meshes with a smaller gear or pinion 21, whereby the latter is extended towards the bottom by a threaded rod 22, which cooperates with a threaded bore 23 provided in a plate 24 which is attached in some appropriate manner to bodies 10 and 11. Towards the rear, this plate 24 is provided with a part 25, which in the present case widens, the ends of which are formed as stub shafts, respectively 26 and 27, over which links are fitted, respectively 28 and 29. The latter are appropriately fitted at their other end upon stub shafts, respectively 30 and 31 of a support plate 32, whereby the latter is provided at its front end with an adjusting screw 33, of which the free bottom end can cooperate with the top end of afore-mentioned gear or pinion 21, and towards the rear of which an opening 34 is provided into which bar 7 is a sliding fit.

At the locations of stub shafts 30 and 31, cylindrical holes are provided in links 28 and 29, the diameter of which corresponds to that of stub shafts 30 and 31, whereas at the locations of stub shafts 26 and 27 oval holes 35 are provided, as shown schematically in FIGS. 8 to 10, in order to obtain that, in the position as illustrated in FIG. 6, there remains a space 36 below stub shafts 26 and 27, whereas in the position according to FIG. 7, a space 37 is obtained above stub shafts 26 and 27.

The use and operation of the clamping device according to the invention is extremely simple.

When a rim is placed on clamping device 6, depending upon whether a tire has to be fitted or removed, and whilst handle 20 is in position A—see FIG. 4—move the fitting or removing tool 5 in the vertical sense by sliding bar 7 in passage 9, until tool 5 rests freely upon the rim, whereas simultaneously the entire clamping device is shifted horizontally along beam 13 until tool 5 is approximately located against the edge of the rim.

Handle 20 is next moved from position A to position B—see FIG. 4—whereby we obtain, on the one hand, due to the rotation of threaded rod 17, that the end 18 of this rod is pressed against beam 13, whereby body 11 is in sort locked with respect to this beam, whereas simultaneously, also by means of the same rotation, gear 19 drives pinion 21, thus bringing about, due to the presence of threaded rod 22 in cooperation with threaded bore 23, that this pinion 21 is moved upward, with as further consequence that this pinion, via adjusting screw 33, tilts plate 32, around stub shafts 30-31 whereby, as schematically shown in FIG. 7, opening 34 in plate 32 locates aslant with respect to bar 7, so that the latter is clamped in opening 34, one and other in such a manner that any vertical movement of bar 7 with respect to plate 32 becomes impossible.

When, in the course of the same movement of handle 20 from location A to location B, bar 7 is solidly clamped in plate 32, any further rotation of handle 20 will move the entire plate 32, together with links 28 and 29 as well as bar 7 with tool 5, upwards over a small distance, which is possible due to the presence of the oval holes 35 in the bottom ends of links 28 and 29.

By means of this latter movement we obtain that tool 5, which originally rested on the edge of the rim, is lifted by a small distance, of the order of 1 to 3 mm, so that any interference of the tool with the rim during the fitting or the removing of a tire is entirely avoided.

It is now perfectly clear that by one single movement of the handle, the horizontal as well as the vertical movement of the tool 5 are locked, whereas one moreover obtains that the tool entirely clears the rim during the clamping.

In FIGS. 11 to 13, an alternative form of embodiment is shown in which the bottom wall 38 of passage 12 is build in a slant.

We hereby further obtain that by the rotation of handle 20 from position A to position B, the tool is not merely locked horizontally and vertically and lifted over a small distance, but that this tool is moreover moved over a small distance, of the order for instance of 1 to 4 mm, sideways of the rim, by the fact that body 11 tilts around R, whereby bar 7 is brought from position X—X to position Y—Y.

It is perfectly obvious that the rim is now cleared vertically as well as horizontally.

The present invention is by no means limited to the form of embodiment described as example and illustrated in the appended drawings, but such a clamping device could be built in any shape or dimension without going beyond the scope of the invention.

In consequence, a first alternative which may come to mind might for instance consist in replacing handle 20 by a power cylinder.

I claim:

1. In a tire fitting and removing apparatus having a base, a wheel holder, an upstanding support on said base and a horizontal beam extending from said support over said wheel holder, the improvement comprising: a tire engaging tool mounted at the lower end of a vertical rod (7), a body (10, 11) with a vertical passage (9) in which said vertical rod (7) is slidably mounted and with a horizontal passage (12) through which said horizontal beam (13) extends and on which beam said body (10, 11) is slidably mounted, first (19, 20, 17) and second (19, 20, 21, 22) operating means (19, 20, 21, 22, 17), first clamping means (18) controlled by and coupled with said first operating means for clamping said horizontal beam (13) in said horizontal passage (12), second clamping means (24-33) controlled by and coupled with said second operating means for clamping said vertical rod (7), said first and second operating means having common control means (19, 20) and third means (35) forming part of said second clamping means for lifting said vertical rod a predetermined height relative to said beam when said second clamping means is operated.

2. Apparatus as defined in claim 1, wherein said second clamping means include a plate (24) having a further passage (34) for said vertical rod (7), said plate (24) being at its one end hingedly coupled (28, 29) to said body and being at its other end provided with a stop member (33) the lower end of which is cooperable with said operating means to pivot said plate to thereby clamp said vertical rod in said further passage (34).

3. Apparatus as defined in claim 2, wherein said plate (24) is hingedly coupled to said body (10, 12) by means of at least one link (28, 29), this hinged connection being by means of an elongated hole (35) forming said third means, the larger axis of said elongated hole being directed vertically.

4. Apparatus as defined in claim 1, wherein said second operating means include a pinion (21) having an upper end cooperable with said stop member (32) and a threaded lower end (22) rotatably mounted in a threaded hole in said plate (24), and a gear wheel (19) meshing with said pinion (21) and arranged to rotate said pinion (21) which as a consequence thereof moves upwardly and thereby comes into contact with said stop member (33), whereby said plate (24) is pivoted, said gear wheel being common to said first and second operating means.

5. Apparatus as defined in claim 1, wherein said first operating means comprises a gear wheel (19) which is common to said first and second operating means and which has a threaded lower rod (17) rotatably mounted in a threaded hole (15) of said body, said threaded hole (15) communicating with said horizontal passage (12) and wherein said first clamping means is formed by the lower end portion (18) of said lower rod (17).

6. Apparatus as defined in claim 2, wherein said stop member (32) is adjustable.

7. Apparatus as defined in claim 5, wherein said threaded hole (15) in said body is oblique.

8. Apparatus as defined in claim 5, wherein said first and second operating means further include a common handle (20) coupled to said gear wheel (19).

9. Apparatus as defined in claim 5, wherein said first and second operating means further include a common power cylinder coupled to said gear wheel (19).

* * * * *